United States Patent
Schweitzer et al.

(10) Patent No.: US 7,144,559 B2
(45) Date of Patent: *Dec. 5, 2006

(54) DEVICE AND PROCESS OPTIMIZING THE CIRCULATION OF A SUSPENSION IN AN INSTALLATION COMPRISING A FISCHER-TROPSCH REACTOR

(75) Inventors: Jean-Marc Schweitzer, Serpaire (FR); Eric Lenglet, Rueil Malmaison (FR); Franck Gaviot-Blanc, Vienne (FR)

(73) Assignees: Institut Francais du Petrole, Ruel Malmaison Cedex (FR); AGIP Petroli S.p.A, Rome (IT); ENI S.p.A. division de AGIP, Rome (IT)

( * ) Notice: Subject to any disclaimer, the term of this patent is extended or adjusted under 35 U.S.C. 154(b) by 737 days.

This patent is subject to a terminal disclaimer.

(21) Appl. No.: 10/178,906

(22) Filed: Jun. 25, 2002

(65) Prior Publication Data
US 2003/0018089 A1   Jan. 23, 2003

(30) Foreign Application Priority Data
Jun. 25, 2001   (FR) .................................. 01 08441

(51) Int. Cl.
*B01J 8/00* (2006.01)
*C07C 27/00* (2006.01)
(52) U.S. Cl. ........................ 422/234; 518/705
(58) Field of Classification Search ................. 422/190; 210/788; 518/700, 705; 502/20, 21
See application file for complete search history.

(56) References Cited

U.S. PATENT DOCUMENTS 3,546,296 A    12/1970   Gobron et al.
5,900,159 A *  5/1999    Engel et al. ................. 210/788

FOREIGN PATENT DOCUMENTS

EP   0 952 132   10/1999
FR   1 038 608    9/1953

* cited by examiner

*Primary Examiner*—Glenn Caldarola
*Assistant Examiner*—Tom P. Duong
(74) *Attorney, Agent, or Firm*—Millen, White, Zelano, Branigan, P.C.

(57) ABSTRACT

Installation for chemical conversion of a feedstock by Fischer-Tropsch reaction comprising a reactor that contains a slurry constituted by at least one suspension of at least one solid in a liquid, a gas feed, a circuit, external to the reactor, of continuous circulation of a stream of slurry, whereby said slurry is drawn off at least one point (A) and reintroduced at least in part at least one other point (B), a section for separation of at least one slurry fluid that passes through said external circuit, whereby said installation also comprises: means allowing to shut down the circulation of said slurry in said circuit, means for introducing under pressure at least one fluid for purging the slurry that is contained in the circuit, and means allowing the circulation of the slurry in said external circuit under conditions such that the Reynolds number is greater than 2,500.

12 Claims, 1 Drawing Sheet

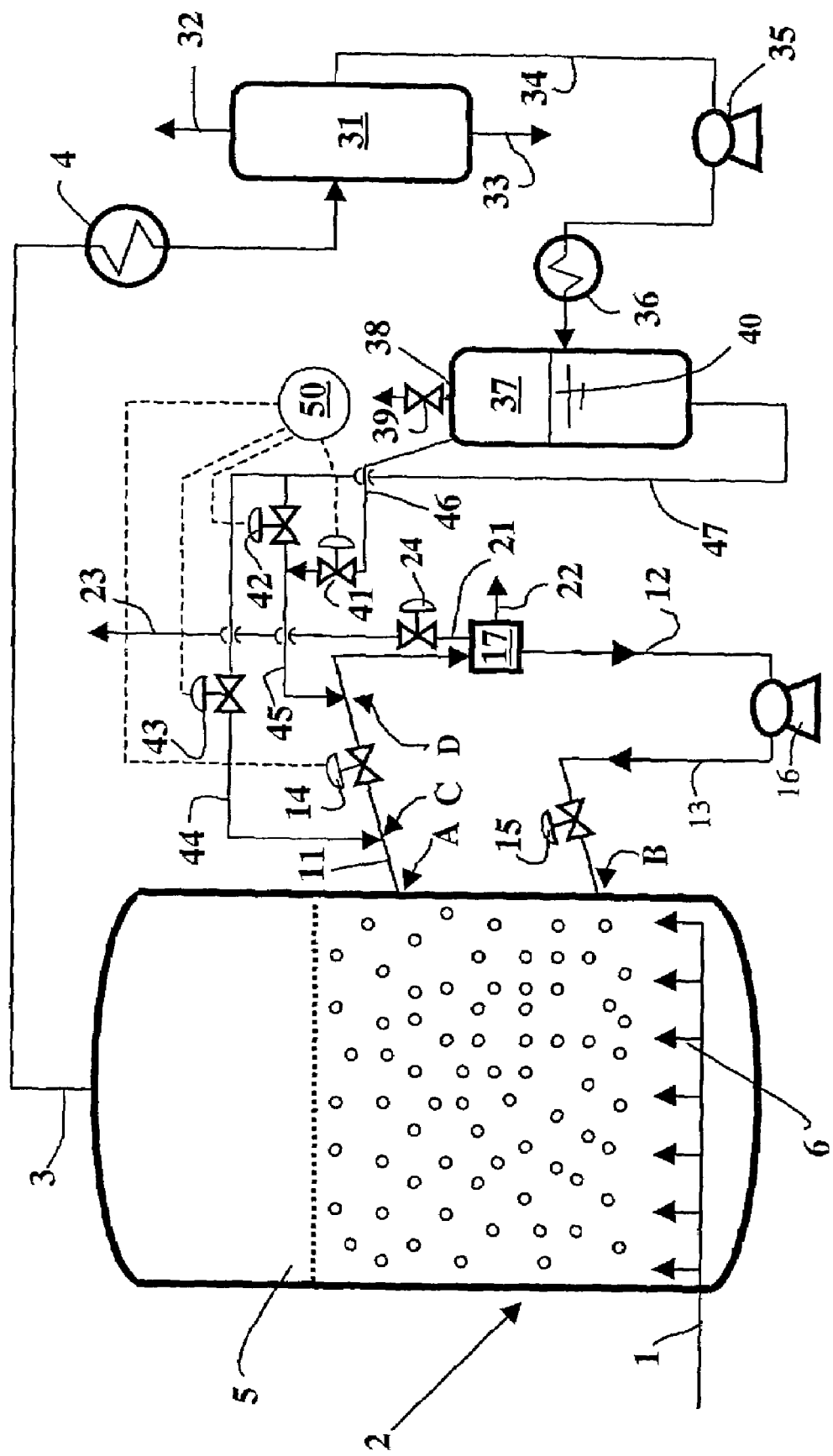

DEVICE AND PROCESS OPTIMIZING THE CIRCULATION OF A SUSPENSION IN AN INSTALLATION COMPRISING A FISCHER-TROPSCH REACTOR

This invention relates to a device and a process for chemical conversion of a feedstock, for example a hydrocarbon feedstock, in a three-phase reactor that is also called a "slurry" reactor in which a so-called Fischer-Tropsch reaction is carried out. More particularly, this process is used for the conversion of synthesis gas (of a composition that is close to $CO+2H_2$) by the so-called Fischer-Tropsch reaction, in particular with a catalyst with iron or with cobalt.

By the English term "slurry," one skilled in the art generally designates a suspension of solid particles in a liquid, for example a suspension of fine particles with a mean diameter that is in general less than or equal to about 200 micrometers, at a mass concentration of the solid in the liquid that is most often between 0.1% and about 70%. In this invention, a mixture of a suspension, as described above but that also comprises a gas phase, i.e., a divided solid/liquid/gas three-phase mixture, will also be designated by slurry. Without exceeding the scope of the invention, the reagents of the chemical reaction that is implemented can be contained in the gas phase, in the liquid phase, in the solid phase or even in several of these phases. Said solid phase is most often a catalyst of the Fischer-Tropsch reaction.

One of the most significant technical problems in the slurry reactor processes (three-phase) is to avoid the decanting of the solid or the gradual fouling that can go so far as to clog different portions of the installation. More particularly, the use of a slurry process exhibits important constraints that are linked to the transport of the latter in the pipes.

Curative means allowing to limit deposits or to clean lines by circulation of a washing liquid are already known.

These means are described in, for example, U.S. Pat. No. 4,526,764 or U.S. Pat. No. 4,123,601.

The applicant found, surprisingly enough, that a slurry circulation under special conditions of the invention would allow it possible to avoid and to prevent the beginning stage of a phenomenon of fouling circulation lines of said slurry. A minimum circulation speed of the slurry thus must be ensured to avoid sedimentation problems in the lines that could lead to clogging. An inadequate slurry circulation speed actually causes the deposit of solid in the lines that are horizontal or slightly oblique by sedimentation of the solid that leads to the gradual obstruction of the latter. When there exist, for example, several circuits that are external to the reactor, it can be brought to pass from one circuit to the other. In this case, slurry no longer passes through certain slurry lines. There then is sedimentation of the solid that is contained in these lines that thus causes the complete clogging of the circuit upon shutdown. It is therefore impossible to pass this circuit again without having previously cleaned and unclogged it. According to another example, when the slurry recirculation pump is shut down, it is necessary to rinse the lines with a fluid so as to remove the solid that is deposited in said lines after the pump is shut down.

This invention relates to a device and an associated process that is used in an installation that uses a slurry reactor and that has increased reliability with regard to risks of solid deposits and clogging of various portions of the installation relative to the devices of the prior art. The invention advantageously allows to avoid the beginning stage of the phenomenon of deposition of solid particles that are contained in slurry, for example in the case of poor operation of the installation or in the case of a voluntary shutdown of the latter.

Another object of the invention is to greatly reduce the maintenance costs that are linked to phenomena of solid deposits in a slurry reactor.

For this purpose, in an experimental installation, the applicant studied various speeds of slurry circulation in the reactor, on the one hand, and, on the other hand, in a slurry circulation loop that is external to the reactor, used to carry out a liquid/solid separation and to recover the liquid that is produced by the chemical reaction.

Surprisingly enough, it was found that the risks of solid deposits are less significant in the reactor than in the external circulation loop. Thus, in normal operation of the reactor, the suspension is continued to be stirred because of the surface velocity of gas $V_g$ and sometimes by the use, in addition to the effect of the gas, of a rising liquid surface velocity. The conditions for obtaining a stable suspension are known to one skilled in the art. These conditions make it possible to prevent the solid deposits above the mean level where gas is injected into the reactor. By testing different conditions with a beginning stage of decanting of the solid, the applicant found that during the beginning stage of decanting, it was generally possible to restore an essentially homogeneous suspension by increasing the surface velocity of the gas all the more easily since the injection of gas is carried out at a number of points.

On the contrary, it was found by the applicant that a beginning stage of solid deposits in external circulation lines could be eliminated only with difficulty by simple increase of the circulation velocity of the slurry. It is therefore more difficult to restore the optimal state of operation, i.e., the absence of deposits, for the external circulation lines. Furthermore, it was found that a beginning stage of deposition promoted subsequent deposits, which aggravates the fouling process.

Moreover, the applicant found, surprisingly enough, that a correlation existed between the problems encountered and the operational disturbances in particular during shutdowns in the installation, even of short duration.

The invention therefore proposes a device that no longer makes it possible to limit the deposits or to eliminate them but to avoid in large part, and even totally, the beginning of a deposition process, a process that accelerates once started.

The invention preferably also provides a device of optimal reliability allowing thus to avoid the starting of the deposition process even in the case of immediate non-availability of the operators of the installation. The device, automated, thus eliminates the risks of making a false move and makes it possible to limit the personnel required for the good operation of the installation.

To carry out an effective cleaning of the external circuit lines, it is necessary according to the invention to proceed according to the following stages:

Begin the rinsing before the deposition of a notable fraction of the solid in the pipe and preferably before the beginning of the phenomenon of sedimentation of the solid in said pipe; if there are several lines in the external circuit, an automatic rinsing system is necessary, Ensure a velocity of rinsing liquid that is at least superior to a minimum velocity that allows a suspension of solid particles in the pipes that are horizontal or slightly oblique of an external circuit or circuits that have, for example, an angle that is less than 60° relative to the horizontal line, whereby the injected rinsing liquid volume is advantageously at least twice equal to the volume of the line to be rinsed to ensure a good rinsing efficiency, Use a rinsing liquid that does not have interaction with the catalyst that can cause its deterioration and therefore its deactivation, Preferably use a rinsing liquid that has a solidification point that is less than or equal to that of the liquid fraction of the slurry and generally less than the ambient temperature to prevent said problems in case the installation is shut down.

In its most general form, the invention relates to an installation for chemical conversion of a feedstock that is rich in hydrogen and in carbon monoxide by the Fischer-Tropsch reaction that comprises at least one reactor that contains a slurry that consists of at least one suspension of at least one solid in a liquid, a gas feed that is located in the lower portion of this reactor, a circuit, external to the reactor, of continuous circulation of a stream of slurry, whereby said slurry is drawn off at at least one point (A) of the reactor and reintroduced at least in part at at least one other point (B) of said reactor, a section for separating at least one fluid that is contained in the stream of slurry passing through said external circuit, whereby said installation is characterized in that it also comprises:

Means allowing the shutting down of the circulation of said slurry in said circuit, Means for introducing under pressure at least one fluid for purging the slurry that is contained in the circuit at at least one point (D) of said circuit, Means allowing the circulation of the slurry in said external circuit under conditions such that the Reynolds number is greater than 2,500 at any point of said circuit.

Said introduction point or points are preferably placed in said circuit between said means for shutting down the circulation of slurry and said separation section.

According to the first embodiment of the invention, at least one of said purging fluids is a pressurized gas.

According to another embodiment that can be combined with the preceding one, at least one of said purging fluids is a pressurized liquid.

In general, said means for shutting down the circulation and the evacuation of said slurry comprise:

At least one isolating valve that is placed on said circuit,

Means for linking at least one point of introduction (D) of the circuit with a source of at least one fluid under a pressure that is greater than that of point (D), whereby this fluid is essentially devoid of suspended solid, A free volume in the upper portion of the reactor above the liquid/solid suspension, whereby this volume is larger than the volume of the liquid/solid suspension that is contained in the circuit and in the separation section.

Advantageously, said installation comprises means for detecting at least one operational malfunction of said installation connected to means for control of the means of closing the isolating valve and opening at least one valve that allows the linking of said circuit with said pressurized fluid source.

Typically, said reactor also comprises:

Means for injecting said reactive gas at a number of points,

Means for suspending and stirring slurry in the reactor, whereby said means are sized to avoid the deposits of solid in the reactor above the injection points of said gas.

According to a preferred embodiment of the invention, said means that allow the circulation of the slurry in said external circuit are sized such that the Reynolds number of the slurry varies between 2,500 and 500,000 at any point of said external circuit.

Advantageously, said installation also comprises means for condensation of at least a portion of the gaseous effluent that is obtained from the reactor, means for storage of at least a portion of the condensed effluent, whereby said storage means are connected to means for introducing purging fluid or fluids into said circuit.

Most often, said solid in suspension is a catalyst of the Fischer-Tropsch reaction and said pressurized fluid is a fluid that is chemically compatible with said catalyst.

This invention also relates to a process allowing the use of the installation as described above in which a purging fluid that comprises at least in part at least one fraction of at least one of the effluents of the Fischer-Tropsch reaction is used.

As an alternative or in combination, said purging fluid can comprise, without exceeding the scope of the invention, at least one fluid that is selected from the group constituted by nitrogen, hydrogen, carbon monoxide, liquid or vaporized hydrocarbons that primarily comprise compounds having less than 20 carbon atoms and mixtures having formed completely or partly from these different fluids.

In general, the purging fluid that is selected in this case exhibits a solidification point that is less than that of the liquid phase that is contained in the slurry and/or less than the ambient temperature.

BRIEF DESCRIPTION OF THE DRAWINGS

The invention will be better understood from reading the following description, illustrated by the attached FIGURE that shows a diagram of a portion of a chemical conversion installation according to the Fischer-Tropsch reaction, thanks to a reactor that comprises a slurry.

The FIGURE comprises a slurry reactor (2) that comprises in its lower portion a reactive gas feed line 1, injected into reactor (2) at a number of injection points 6. In the upper portion of reactor (2) is found a zone (5) of an essentially gaseous phase, located above the slurry. Said slurry is in a three-phase form and appears in the form of a continuous phase that consists of a liquid/solid suspension through which gas bubbles pass.

At the top of reactor (2), a line (3) makes it possible to evacuate the gaseous effluents that are obtained from the reaction and that comprise the unconverted gases and the gaseous products of the reaction. These gaseous effluents pass through a cooling exchanger (4), whereby said cooling entrains the condensation of a portion of the heaviest compounds that are separated in a separator tank (31). This tank allows to separate a gas phase that is evacuated via line (32) of a first liquid phase, for example water, evacuated via line (33), and a second liquid phase, for example hydrocarbons that are produced by the reaction. Said hydrocarbons are then evacuated via line (34). This last liquid phase is pumped using a means (35) and then is reheated in heat exchanger (36) under conditions allowing a partial vaporization of said phase, then fractionated in separator tank (37). The gas phase that reaches tank (37) is evacuated via a line (38) on which is found a pressure regulating valve (39), but it can also be evacuated via a line (46) that comprises an automated valve (41). The liquid phase, stored in lower portion (40) of tank (37) is evacuated in a line (47), which is subdivided into two lines: a line (44) on which is found automated valve (43) and a line (45) on which is found automated valve (42). Said lines (44) and (45) are connected to a slurry circulation circuit that is external to reactor (2). This circuit comprises a line (11) that leaves from a point (A) for drawing off slurry into the reactor. Line (11) comprises an isolating (on-off or block) valve (14) that is automated and two points (C) and (D) for connecting respectively to lines (44) and (45) that are lines for circulating pressurized fluid obtained from tank (37). Line (11) is connected to a separation zone (17). The gas that is contained in the slurry is separated in said zone (17) and evacuated via line (23) on which is found an automated valve (24). Zone (17) also advantageously allows a separation of a fraction of the liquid that is contained in the slurry, whereby said fraction is then evacuated via line (22). The residual slurry, from which essentially all of the gas and a portion of the liquid that constitutes it are removed, is evacuated from zone (17) via line (12), pumped by a means (16) such as a recirculation pump and sent into a line (13) on which is found an automated valve (15). Said residual slurry is then reintroduced into the reactor at point (B) in a zone that is preferably located in the lower portion of the reactor and upstream from point (A). In this case, the recycling of slurry at point (B) creates a rising circulation of slurry in the reactor between points (B) and (A).

In this description, the term "slurry stream" equally designates the three-phase slurry stream that is drawn off from the reactor at point (A) or the slurry stream that is degassed and concentrated by separation of a portion of the liquid, exiting from zone (17) and circulating in lines (12) and (13). Separation zone (17) can comprise in particular gas/liquid or gas/liquid and solid separating means, for example a gas separator tank, as well as means for liquid/solid separation, for example a decanter, a hydrocyclone or a filter. The diagram of zone (17), not characteristic of the invention, will not be explained in detail. Said zone generally comprises, according to the rules of the art, one or more volumes that contain slurry, whereby said volumes integrate one or more of the above-named means.

The installation also preferably comprises automated control means such as a programmable automatic system (50) that are connected to isolating valve (14) as well as to valves (41), (42) and (43). Automatic system (50) advantageously can also be connected to valve (15) and to valve (24) by means that are not shown, as well as to means that are not referenced for detecting operational malfunctions of the installation.

The installation comprises at least one reactor (2) that comprises a slurry and that operates under a pressure that is typically between 1 and 5 MPa (Megapascals), for example, about 2 MPa (Megapascals), whereby said reactor (2) is fed by a reactive gas that is rich in hydrogen and in carbon monoxide, for example a composition mixture that is close to $CO+2\ H_2$. The catalyst is generally a divided solid of mean grain size (median diameter that corresponds to 50% by weight of the solid, i.e., 50% by weight of the particles have a grain size that is less than or equal to this diameter and 50% by weight of the particles have a grain size that is greater than or equal to this diameter) of between 2 and 200 micrometers, for example 60 micrometers. Said catalyst generally comprises iron and cobalt. The gaseous reactive mixture is introduced into line (1) and distributed in the slurry at a number of injection points (6). The number of injection points is at least equal to 2 per square meter of horizontal section of the reactor, preferably between 4 and 400 per square meter of reactor, and, for example, from about 20 points per square meter.

According to the invention, the stirring of the reactor is adequate to avoid essentially any deposit of solid above the gas injection points. An adequate gas surface velocity $V_G$ will generally be used to obtain a turbulent speed, rather than a state of viscous flow, but this velocity can easily be determined in the laboratory.

For a slurry of mean grain size that is less than 100 micrometers, it is also possible to use a gas surface velocity $V_G$ of between 0.12 and 0.50 m/s, preferably between 0.12 and 0.35 m/s, whereby the rising surface velocity of the liquid between points (B) and (A) of the reactor is most often greater than the decanting speed of the solid and generally between about 0.001 and about 0.15 m/s, typically from about 0.02 m/s. Said decanting speed will be calculated according to the rules of the art or measured in a laboratory.

Under these conditions, the slurry is stirred adequately to avoid significant deposits of solid particles above gas injection points (6).

According to the embodiment that is described in connection with the FIGURE a stream of slurry is circulated in the external circuit of point (A) to point (B) via lines (11), (12) and (13), whereby the amount of slurry that is reintroduced at point (B) in the reactor makes it possible to obtain a liquid surface velocity $V_L$ in the reactor.

The conditions above also make it possible to restore a correct suspension in the reactor after a beginning stage of decanting solid particles in the reactor, thanks to an increase in velocities $V_G$ and/or $V_L$.

A portion of the liquid that circulates in the external stream is separated in a separation zone (17) that comprises a filter or a decanter so as to keep the slurry level constant in the reactor.

According to the invention, pump (16) ensures a circulation of slurry in different lines of circuit (11, 12, 13) with an adequate velocity for each line such that the Reynolds number that is defined by the equation $$Re = \frac{\rho V D}{\mu}$$

with

ρ: density of the slurry that circulates in said line,
V: velocity of said slurry (calculated, for example, by making the hypothesis of a velocity of the gases that is identical to that of the suspension, in the particular case of a three-phase slurry),
$D_H$: hydraulic diameter of the line,
μ: viscosity of the slurry (the single viscosity of the liquid/solid suspension, continuous phase, will typically be taken), is greater than 2,000, in particular greater than 2,500 and even 3,000. It will be possible to select, for example, a Reynolds number of between about 3,000 and about 500,000, for example close to 20,000. The slurry circulation velocity will preferably be greater than 0.30 m/s, for example between 0.5 and 2 m/s. The installation preferably also comprises means for detecting at least one operational malfunction. This malfunction can be linked to the reactor, for example too high a temperature, or an abnormal level of slurry in reactor (2). According to the invention, said means can also relate to an operational error of a piece of equipment that is external to the reactor and more particularly a piece of equipment of separation zone (17): gas/solid and liquid separator tank, decanter, filter, hydrocyclone, recirculation pump (16), etc. . . .

In this case, according to the invention, a series of associated means allowing to purge the external circuit immediately, i.e., to evacuate the slurry that is contained in lines (11), (12), (13) as well as in separation section (17) and to transfer this slurry into the reactor, is used. During the malfunction, for example an operational malfunction of the separation section is detected, programmable automatic system (50) triggers a purging procedure of the slurry that is contained in external circuit (11, 12, 13) before there is a significant deposition of solid in the circuit, preferably before any beginning stage of sedimentation of solid particles of the slurry. This allows, according to the invention, to avoid a lasting clogging of the circuit, whereby the solid tends to stick to the inside walls, thus facilitating subsequent clogging.

The preferred procedure for purging the circuit is an automated procedure, managed by programmable automatic system (50). This procedure comprises the automated closing of valves (14) and (24), whereby said closing entrains the shutting down of the recirculation of slurry in circuit (11, 12, 13) and the output of gases via line (23). The automatic system then automatically opens at least one of valves (41), (42) or (43) that link the circuit with a "true" pressurized fluid, i.e., devoid of solid, whereby said fluid makes it possible to displace the slurry outside of the external circuit.

The circuit preferably is first linked with a pressurized gas source by opening automated valve (41) that is connected to the gas volume that is contained in the upper portion of tank (37). Alternately, it will also be possible to use, without exceeding the scope of the invention, another gas source, for example methane, feed gas of the reactor, or nitrogen. The pressure of the source of gas that is used is advantageously greater by at least 0.02 MPa than the pressure for introducing gas in the circuit, i.e. at point (D). Preferably, according to the invention, a gas that is under a pressure that is greater by at least 0.1 MPa, and preferably greater by about 0.3 MPa than the pressure of the circuit is used.

The differential pressure between the gas source and the circuit is enough to advance and displace the slurry in the circuit lines with a local Reynolds number of greater than 2,500 at any point of circuit (11, 12, 13) of between 3,000 and 500,000 and preferably greater than 2,500. According to the invention, the Reynolds number can still be less than 2,500, for example less than 2,000 in the volume or volumes included in separation section (17), whereby the latter advantageously have walls that are typically inclined by at least 60° relative to the horizontal line.

Points (C) and (D) are preferably close enough to valve (14) so that at least 80%, preferably at least 90%, and very preferably more than 97% of the portions that are horizontal or slightly oblique of circuit (11, 12, 13) are flushed.

The purging of the circuit being generally quick, it is possible according to the invention to use a Reynolds number that is slightly lower than the one that is used during the normal operation of the installation; it is preferable, however, to use safety ranges and to use Reynolds numbers that can be variable along lines (11, 12, 13) but in particular between 3,000 and 500,000, advantageously greater than 10,000, both during normal operation and in case the installation is shut down. According to the invention, the closing of the circuit by valve (14) and the introduction of pressurized gas between valve (14) and separation section (17) (that comprises at least one volume as defined above) by a line (45) makes it possible to displace the slurry that is contained in particular in said volume or volumes downstream from the circuit, and its reintroduction into the reactor at point (B). The duration of the pressurized gas injection will be selected by one skilled in the art to displace the largest portion of the slurry that is contained in the circuit, separation section (17) included. The terms "upstream" and "downstream" are defined in this description relative to the normal direction of circulation of slurry, in the reactor as in the external circuit.

After this injection of gas, automatic system (50) then opens automated valve (42) that makes it possible to link the portion of the circuit that is found downstream from valve (14) with a true liquid and under a pressure that exceeds the one that is present in said circuit, with a differential pressure that is similar, for example, to the one that is described above for the gas. This liquid will, with a "piston" effect that exceeds that of the gas, displace the residual slurry that optionally remains in the lines of said circuit. According to the invention, it was found by the applicant, surprisingly enough, that a liquid was more effective for purging slurry lines, whereas a gas was more effective for purging volumes such as the ones that are in separation section (17). The combination of a gas and a liquid, introduced simultaneously or preferably one after the other (gas then liquid), is therefore preferred according to the invention for carrying out said purging.

According to a preferred embodiment of the invention, an isolating valve (14) that is located on the slurry circuit that is external to the reactor will be used upstream from a volume that is in a separation zone (17) and means for introducing a fluid under a pressure that is greater than the one of said circuit, whereby said introduction is carried out at a point that is between said valve (14) and said volume.

It is also possible to open, from the beginning of the purging procedure or after valve (14) is closed, automated valve (43) to purge the upstream portion of the circuit. Pump (16) is preferably shut down from the beginning of said procedure.

According to the FIGURE the pressurized liquid that is contained in lower portion (40) of tank (37) is obtained by condensation of the gases that are obtained from the reactor after passing into exchanger (4). Said gases primarily contain light hydrocarbons that are produced by the Fischer-Tropsch reaction, in particular those containing essentially less than 20 carbon atoms. The hydrocarbons are condensed in tank (31) at a temperature of about 50° C., pumped by means (35), then reheated and partially evaporated in exchanger (36) to produce both a gas source and a liquid source, under a pressure that exceeds that of the slurry circulation circuit. To increase the flow of available gas, it is also possible to add nitrogen or methane or feed gas of reaction (2). These pressurized fluid sources are chemically compatible with the catalyst, whether it contains iron or cobalt. It is actually important not to use fluids that can deactivate the catalyst, for example water or water vapor for a Fischer-Tropsch reaction with a catalyst that contains cobalt.

According to a preferred form of the invention, the largest portion of slurry that is contained in the circuit is first purged according to the process described above by the pressurized gas source, for example by introducing by point (D) a gas volume of, for example, between 1 and 5 times the liquid/solid suspension volume that is contained in the circuit, preferably between 1 and 3 times said volume. Purging of the residual slurry is then finished by introducing by point (D) a pressurized liquid volume of, for example, between 0.5 and 3 times the liquid/solid suspension volume initially contained in the circuit, preferably between 0.5 and 1.5 times said volume. At the same time that the circuit is purged by point (D), thanks to the same pressurized fluids (liquid and gas), the upstream portion of the circuit is purged by point C, thanks to a pressurized liquid circulation in line (44). The slurry that is contained in this portion of the circuit is then transferred into the reactor at point (A).

When the operations for purging the circuit are ended, automatic system (50) triggers the closing of fluid feed valves (41), (42), and (43) and the closing of valve (15) downstream from the circuit. The circuit can then be isolated, for example, for maintenance operations or reactivity by the start-up of pump (16) and the opening of valves (14) and (15). Advantageously, the connection pieces of the slurry circuit on the reactor are inclined at points (A) and (B), as shown in FIG. 1, so that there is no solid deposit obtained from slurry that is contained in the reactor in said connection pieces.

If the upstream portion of the circuit between point (A) and valve (14) is inclined by, for example, at least 60° relative to the horizontal line, it optionally is possible not to purge this portion of the circuit, whereby the solid particles return to the reactor without becoming caught on the inclined walls under the effect of the sole forces of gravity.

According to the invention, the reactor has an adequate additional free volume (5) at the top of the reactor above a slurry level that corresponds to normal operation of the reactor to collect the slurry surplus that is obtained from circuit (11, 12, 13) during its evacuation, as well as the pressurized liquid volume that is fed into the circuit during its evacuation. The (gaseous) free volume at the top of the reactor is, according to the invention, greater than the volume of the liquid/solid suspension of slurry that is initially contained in the circuit, separation section (17) included, during the normal operation of the installation.

This free volume advantageously can be between 1.1 and 20 times the volume of the suspension in the circuit and preferably between 1.3 and 13 times this volume.

According to the invention, it is not necessary that all of the operational malfunctions of the installation bring about the shutting down of the circulation and the evacuation of the external slurry circuit. For example, if there is a redundant unit for slurry circulation pump (16) and one of the two pumps breaks down, it is possible, thanks to automatic system (50), to start up the other pump, to purge the defective pump by the pressurized liquid, according to the process that is described above, and to isolate this defective pump by closing valves upstream and downstream, whereby the second pump allows the recirculation of the slurry.

The automated shutdown without delaying the circulation and the complete purging of the slurry circuit are preferably reserved, according to the invention, for significant malfunctions, in particular those of non-redundant pieces of equipment located on the circuit itself, which require a shutdown of the operation of the circuit.

The invention therefore proposes, in combination, a unit of technical means allowing to avoid the fouling and/or the clogging of slurry-type reactor facilities and in particular to avoid these problems in the delicate case of the occurrence of an operational malfunction in the slurry circulation circuits. It therefore allows increase the reliability and to reduce the maintenance of installations comprising a slurry reactor.

The preceding examples can be repeated with similar success by substituting the generically or specifically described reactants and/or operating conditions of this invention for those used in the preceding examples.

The entire disclosure of all applications, patents and publications, cited above and below, and of corresponding French Application No. 01/08.441, filed Jun. 25, 2001.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An installation for chemical conversion of a feedstock rich in hydrogen and carbon monoxide by a Fischer-Tropsch reaction, said installation comprising:
    at least one reactor (2) containing a slurry comprising at least one suspension of at least one solid in a liquid,
    a gas feed means (6) located in the lower portion of said reactor,
    a circuit (11, 12, 13), external to the reactor, for continuous circulation of a stream of said slurry, said circuit comprising means for withdrawing said slurry at at least one point (A) of the reactor, and means for reintroducing at least a portion of said slurry at at least one other point (B) of said reactor,
    a section for separation (17) of at least one fluid that is contained in the slurry stream that passes through said external circuit (11, 12, 13),
    at least one isolating valve (14) for shutting down circulation of said slurry in said circuit (11, 12, 13),
    means for introducing under pressure at least one fluid for purging the slurry that is contained in the circuit at at least one point (C, D) of said circuit, said means for introducing at least one fluid for purging comprising means (41, 42, 43, 44, 45, 46) for linking said at least one point (C, D) of the circuit with a source of at least one fluid under a pressure that is greater than that of point (C, D), whereby said fluid under pressure is essentially devoid of suspended solid,
    means (16) for circulating said slurry in said external circuit under conditions whereby the Reynolds number is greater than 2,500 at any point of said circuit (11, 12, 13), and
    means for condensing at least a portion of gaseous effluent obtained from reactor (2), and means for storing (37) at least a portion of condensed effluent, wherein said storage means (37) is connected to said means for introducing under pressure at least one purging fluid into said circuit,
    said reactor (2) further comprising a free volume (5) in the upper portion of said reactor (2) above the liquid/solid suspension, said volume being larger than the volume of the liquid/solid suspension contained in the circuit and in said separation section (17),
    said installation further comprising means for detecting at least one operational malfunction of said installation connected to means (50) for obtaining automatic closure of said at least one isolating valve (14), when said at least one operational defect is detected, and for subsequently automatically introducing pressurized fluid by opening of at least one valve (41, 42, 43) thereby linking said circuit with said pressurized fluid source.

2. An installation according to claim 1, wherein said at least one point (D) for introduction of said at least one purging fluid is placed in said circuit (11, 12, 13) between said at least one isolating valve (14) for shutting down the circulation of the slurry and said separation section (17).

3. An installation according to claim 1, wherein said means for introducing under pressure at least one purging fluid is connected to a source of pressurized gas.

4. An installation according to claim 1, wherein said means for introducing under pressure at least one purging fluid is connected to a source of pressurized liquid.

5. An installation according to claim 1, wherein said gas feed means (6) injects reactive gas at a number of points, and said reactor further comprises means for suspending and stirring slurry in said reactor, whereby said means for suspending and stirring slurry are sized to avoid the deposits of solid in said reactor (2) above the injection points of said gas.

6. An installation according to claim 1, wherein said means (16) for circulating said slurry in said external circuit are sized such that said Reynolds number of the slurry varies between 2,500 and 500,000 at any point of said external circuit.

7. An installation according to claim 1, wherein said solid in suspension is a catalyst of the Fischer-Tropsch reaction and wherein said means for introducing under pressure at least one purging fluid is connected to a source of pressurized fluid that is chemically compatible with said catalyst.

8. An installation according to claim 1, wherein said at least one point (C) for introduction of said at least one purging fluid is placed in said circuit (11, 12, 13) between said at least one isolating valve (14) for shutting down the circulation of the slurry and said reactor (2).

9. An installation according to claim 1, wherein said circuit contains at least two points (C, D) for introduction of said at least one purging fluid into said circuit (11, 12, 13), a first point for introduction placed between said at least one isolating valve (14) for shutting down the circulation of the slurry and said reactor (2), and a second point for introduction between said at least one isolating valve (14) for shutting down the circulation of the slurry and said separation section (17).

10. An installation for chemical conversion of a feedstock rich in hydrogen and carbon monoxide by a Fischer-Tropsch reaction, said installation comprising:

at least one reactor (2) containing a slurry comprising at least one suspension of at least one solid in a liquid, a gas feed means (6) located in the lower portion of said reactor, a circuit (11, 12, 13), external to the reactor for continuous circulation of a stream of said slurry, said circuit comprising means for withdrawing said slurry at at least one point (A) of the reactor, and means for reintroducing at least a portion of said slurry at at least one other point (B) of said reactor, a section for separation (17) of at least one fluid that is contained in the slurry stream that passes through said external circuit (11, 12, 13), at least one isolating valve (14) for shutting down circulation of said slurry in said circuit (11,12, 13), means for introducing under pressure at least one fluid for purging the slurry that is contained in the circuit at at least one point (C, D) of said circuit, said means for introducing at least one fluid for purging comprising means (41, 42, 43, 44, 45, 46) for linking said at least one point (C, D) of the circuit with a source of at least one fluid under a pressure that is greater than that of point (C, D), whereby said fluid under pressure is essentially devoid of suspended solid, means (16) for circulating said slurry in said external circuit to under conditions whereby the Reynolds number is greater than 2,500 at any point of said circuit (11, 12, 13), means for condensing at least a portion of gaseous effluent obtained from reactor (2), said means for condensation comprising a heat exchanger (4) for cooling the effluent and a separator tank (31) for separating a gas phase, a first liquid phase, and a second liquid phase, means for removing (34, 35) said second liquid phase from said separator tank, means for heating (36) said second liquid phase, and means for delivering said second liquid phase to a further separator tank (37), wherein said further separator tank (37) is connected to said means for introducing under pressure at least one purging fluid into said circuit, said reactor (2) further comprising a free volume (5) in the upper portion of said reactor (2) above the liquid/solid suspension, said volume being larger than the volume of the liquid/solid suspension contained in the circuit and in said separation section (17), and said installation further comprising means for detecting at least one operational malfunction of said installation connected to means (50) for obtaining automatic closure of said at least one isolating valve (14), when said at least one operational defect is detected, and for subsequently automatically introducing pressurized fluid by opening of at least one valve (41, 42, 43) thereby linking said circuit with said pressurized fluid source.

11. An installation for chemical conversion of a feedstock rich in hydrogen and carbon monoxide by a Fischer-Tropsch reaction, said installation comprising:

at least one reactor (2) containing a slurry comprising at least one suspension of at least one solid in a liquid, a gas feed means (6) located in the lower portion of said reactor, a circuit (11, 12, 13), external to the reactor for continuous circulation of a stream of said slurry, said circuit comprising means for withdrawing said slurry at at least one point (A) of the reactor, and means for reintroducing at least a portion of said slurry at at least one other point (B) of said reactor, a section for separation (17) of at least one fluid that is contained in the slurry stream that passes through said external circuit (11, 12, 13), means (14) for allowing the circulation of said slurry in said circuit (11, 12, 13) to be shut down, means for introducing under pressure at least one fluid for purging the slurry that is contained in the circuit at least one point (C, D) of said circuit, and means (16) for circulating said slurry in said external circuit to under conditions whereby the Reynolds number is greater than 2,500 at any point of said circuit (11, 12, 13), wherein said means for shutting down the circulation comprises at least one isolating valve (14) integral with said circuit (11, 12, 13); and said means for introducing at least one purging fluid comprising means (41, 42, 43, 44, 45, 46) for linking said at least one point of introduction (C), upstream of said isolation valve (14) and at least one other introduction point (D), downstream of said isolation valve (14), with a source of at least one fluid under a pressure that is greater than that of points (C) and (D), whereby said fluid under pressure is essentially devoid of suspended solid; and wherein said reactor (2) further comprises a free volume (5) in the upper portion of said reactor (2) above the liquid/solid suspension, said volume being larger than the volume of the liquid/solid suspension contained in the circuit and in said separation section (17), means for condensing at least a portion of gaseous effluent obtained from reactor (2), and means for storing (37) at least a portion of condensed effluent, wherein said storage means (37) is connected to said means for introducing under pressure at least one purging fluid into said circuit, said installation further comprising means for detecting at least one operational malfunction of said installation connected to means (50) for obtaining automatic closure of said at least one isolating valve (14), when said at least one operational defect is detected, and for subsequently automatically introducing pressurized fluid by opening of at least one valve (41, 42, 43) thereby linking said circuit with said pressurized fluid source.

12. An installation according to claim 11, wherein points (C) and (D) are close enough to valve (14) so that at least 80% of horizontal or slightly oblique portions of the circuit are flushed.

* * * * *

UNITED STATES PATENT AND TRADEMARK OFFICE
CERTIFICATE OF CORRECTION

PATENT NO. : 7,144,559 B2
APPLICATION NO. : 10/178906
DATED : December 5, 2006
INVENTOR(S) : Jean-Marc Schweitzer It is certified that error appears in the above-identified patent and that said Letters Patent is hereby corrected as shown below:

Column 11, line 39, reads "reactor for" should read -- reactor, for --
Column 12, line 30, reads "reactor for" should read -- reactor, for --

Signed and Sealed this

Tenth Day of July, 2007

JON W. DUDAS
*Director of the United States Patent and Trademark Office*